(12) United States Patent
Loezos et al.

(10) Patent No.: US 10,934,491 B2
(45) Date of Patent: *Mar. 2, 2021

(54) TWO-STAGE PROCESS FOR CONVERSION OF SOLID BIOMASS MATERIAL

(71) Applicant: Inaeris Technologies, LLC, Pasadena, TX (US)

(72) Inventors: Peter Loezos, Sugar Land, TX (US); Brian Bibens, Houston, TX (US); Ronald Cordle, League City, TX (US); Bruce Adkins, League City, TX (US); John Hacskaylo, Houston, TX (US)

(73) Assignee: Mard, Inc., Pasadena, TX (US)

( * ) Notice: Subject to any disclaimer, the term of this patent is extended or adjusted under 35 U.S.C. 154(b) by 2049 days.

This patent is subject to a terminal disclaimer.

(21) Appl. No.: 13/734,627

(22) Filed: Jan. 4, 2013

(65) Prior Publication Data

US 2013/0232855 A1 Sep. 12, 2013

Related U.S. Application Data

(60) Provisional application No. 61/583,681, filed on Jan. 6, 2012.

(51) Int. Cl.
| | |
|---|---|
| *C10G 1/00* | (2006.01) |
| *C10G 1/02* | (2006.01) |
| *C10G 3/00* | (2006.01) |
| *C10G 11/00* | (2006.01) |
| *F23K 1/00* | (2006.01) |

(52) U.S. Cl.
CPC .............. *C10G 1/006* (2013.01); *C10G 1/002* (2013.01); *C10G 1/02* (2013.01); *C10G 3/42* (2013.01); *C10G 11/00* (2013.01); *F23K 1/00* (2013.01); *C10G 2300/1011* (2013.01); *F23K 2300/10* (2020.05); *Y02E 50/10* (2013.01); *Y02P 30/20* (2015.11)

(58) Field of Classification Search
CPC . Y02E 50/14; Y02E 50/10; C10L 5/44; C10L 5/445

See application file for complete search history.

(56) References Cited

U.S. PATENT DOCUMENTS

| | | | |
|---|---|---|---|
| 2,556,114 A * | 6/1951 | Smith | B01J 8/26 208/147 |
| 3,691,913 A | 6/1976 | Brenneman et al. | |
| 4,064,018 A | 12/1977 | Choi | |
| 4,090,948 A | 5/1978 | Schwarzenbek | |
| 4,147,593 A | 4/1979 | Frischmuth et al. | |
| 4,153,514 A | 5/1979 | Garrett et al. | |
| 4,266,083 A | 5/1981 | Huang | |
| 4,308,411 A | 12/1981 | Frankiewicz | |
| 4,511,434 A * | 4/1985 | Vasalos | C10B 49/20 202/99 |
| 4,711,873 A | 12/1987 | Suzukamo et al. | |
| 4,851,601 A | 7/1989 | Fukuda et al. | |
| 4,874,507 A | 10/1989 | Whitlock | |
| 4,987,144 A | 1/1991 | Kanamaru et al. | |
| 5,064,527 A | 11/1991 | Singhal et al. | |
| 5,097,088 A | 3/1992 | Fukao et al. | |
| 5,102,628 A | 4/1992 | De Lasa | |
| 5,115,084 A | 5/1992 | Himmelblau | |
| 5,233,109 A | 8/1993 | Chow | |
| 5,504,259 A | 4/1996 | Diebold et al. | |
| 5,599,510 A | 2/1997 | Kaminsky et al. | |
| 5,728,271 A | 3/1998 | Piskorz et al. | |
| 5,792,340 A | 8/1998 | Freel et al. | |
| 5,865,898 A | 2/1999 | Holtzapple et al. | |
| 5,959,167 A | 9/1999 | Shabtai et al. | |
| 5,961,786 A | 10/1999 | Freel et al. | |
| 6,022,419 A | 2/2000 | Torget et al. | |
| 6,069,012 A | 5/2000 | Kayser | |
| 6,248,297 B1 | 6/2001 | Stine et al. | |
| 6,485,774 B1 | 11/2002 | Bransby | |
| 6,814,940 B1 | 11/2004 | Hiltunen et al. | |
| 6,830,597 B1 | 12/2004 | Green | |
| 6,971,594 B1 | 12/2005 | Polifka | |
| 7,044,999 B2 | 5/2006 | Bankstahl et al. | |
| 7,202,389 B1 | 4/2007 | Brem | |
| 7,241,323 B2 * | 7/2007 | Serio | C10B 53/00 422/164 |

(Continued)

FOREIGN PATENT DOCUMENTS

| | | |
|---|---|---|
| CA | 1283880 | 5/1991 |
| CA | 2618000 | 2/2007 |

(Continued)

OTHER PUBLICATIONS

International Search Report for PCT Application No. PCT/US2013/020354; filed on Jan. 7, 2013 dated Apr. 26, 2013; 3 pages.

Lappas, A.A., et al. "Biomass Pyrolysis in a Circulating Fluid Bed Reactor for the Production of Fuels and Chemicals" Fuel IPC Science and Technology Press, Guildford, GB, vol. 81, No. 16, Nov. 1, 2002 (Nov. 1, 2002), pp. 2087-2095m XP004374414, ISSN: 0016-2361.

Huber, George W., et al. "Synthesis of Transportation Fules From Biomass: Chemistry, Catalysts and Engineering" Chem. Rev.: Chemical Reviews, Sep. 2006, vol. 106, No. 9, pates 40-44-4098, 4047-4048, 4061-4063, 4085, 4092-4093, XP002490759.

McKendry, P. "Energy Production From Biomass" Bioresource Technology 83 (2002) p. 37-46.

(Continued)

*Primary Examiner* — Ellen M McAvoy
*Assistant Examiner* — Ming Cheung Po
(74) *Attorney, Agent, or Firm* — John Wilson Jones; Jones Delflache LLP (57) ABSTRACT

A two-stage reactor/process is disclosed for the conversion of solid particulate biomass material and includes: a first stage, in which solid particulate biomass material is pyrolyzed to primary reaction products, and a second stage in which the primary reaction products are catalytically converted in a second stage which is operated at a temperature higher than that of the first stage.

25 Claims, 2 Drawing Sheets

(56) References Cited

U.S. PATENT DOCUMENTS

| | | | |
|---|---|---|---|
| 7,262,331 B2 | 8/2007 | Van de Beld et al. | |
| 7,312,370 B2 | 12/2007 | Pittman et al. | |
| 7,341,973 B2 | 3/2008 | Flego et al. | |
| 7,503,981 B2 | 3/2009 | Wyman et al. | |
| 8,057,641 B2 | 11/2011 | Bartek et al. | |
| 8,277,736 B2* | 10/2012 | Proll | C10G 11/18 422/141 |
| 9,738,833 B2* | 8/2017 | Brady | B01J 23/90 |
| 2004/0069682 A1* | 4/2004 | Freel | C10G 9/28 208/126 |
| 2004/0180971 A1 | 9/2004 | Inoue et al. | |
| 2005/0114554 A1 | 7/2005 | O'Connor et al. | |
| 2006/0185245 A1* | 8/2006 | Serio | C10B 53/02 48/197 FM |
| 2007/0000177 A1 | 1/2007 | Hippo et al. | |
| 2007/0213573 A1* | 9/2007 | Ross | B01J 8/1845 585/242 |
| 2008/0009055 A1 | 1/2008 | Lewnard | |
| 2008/0209797 A1 | 9/2008 | Rendina et al. | |
| 2009/0013601 A1 | 1/2009 | Mandich et al. | |
| 2009/0093555 A1 | 4/2009 | Stites et al. | |
| 2009/0139851 A1 | 6/2009 | Freel | |
| 2009/0165378 A1 | 7/2009 | Agblevor | |
| 2009/0223859 A1 | 9/2009 | Buchert | |
| 2009/0227823 A1* | 9/2009 | Huber | C10G 1/002 585/324 |
| 2009/0308787 A1 | 12/2009 | O'Connor et al. | |
| 2010/0076233 A1 | 3/2010 | Cortright et al. | |
| 2010/0083575 A1 | 4/2010 | Varadaraj et al. | |
| 2010/0113849 A1 | 5/2010 | Bartek et al. | |
| 2010/0162625 A1 | 7/2010 | Mills | |
| 2010/0178217 A1 | 7/2010 | Alyaser | |
| 2010/0228062 A1* | 9/2010 | Babicki | C01B 3/56 585/240 |
| 2010/0270506 A1* | 10/2010 | Goetsch | C10J 3/482 252/373 |
| 2010/0281759 A1 | 11/2010 | Yanik et al. | |
| 2012/0117860 A1* | 5/2012 | Brady | B01J 23/90 44/307 |
| 2012/0160741 A1* | 6/2012 | Gong | C10G 1/002 208/113 |
| 2012/0193581 A1 | 8/2012 | Goetsch et al. | |
| 2012/0203042 A1* | 8/2012 | Huber | C10G 1/002 585/241 |

FOREIGN PATENT DOCUMENTS

| | | | |
|---|---|---|---|
| CN | 103313783 A | 9/2013 | |
| DE | 202006012176 | 12/2006 | |
| EP | 1719811 | 11/2006 | |
| EP | 1852466 | 11/2007 | |
| EP | 1852490 | 11/2007 | |
| EP | 1852492 | 11/2007 | |
| EP | 1878783 | 1/2008 | |
| EP | 2105486 | 9/2009 | |
| EP | 2107100 | 10/2009 | |
| EP | 2199364 | 6/2010 | |
| WO | WO1981/01713 | 6/1981 | |
| WO | WO1994/10107 | 5/1994 | |
| WO | WO 9410107 A1 * | 5/1994 | C10B 49/12 |
| WO | WO2002/14040 | 2/2002 | |
| WO | WO2002/83816 | 10/2002 | |
| WO | WO2006/117006 | 11/2006 | |
| WO | WO2007/128798 | 11/2007 | |
| WO | WO2007/128799 | 11/2007 | |
| WO | WO2007/128800 | 11/2007 | |
| WO | WO2008/006943 | 1/2008 | |
| WO | WO2008/011598 | 1/2008 | |
| WO | WO2008/052993 | 5/2008 | |
| WO | WO2008/101949 | 8/2008 | |
| WO | WO2009/118352 | 10/2009 | |
| WO | WO2009/118363 | 10/2009 | |
| WO | WO2009/143017 | 11/2009 | |
| WO | WO2010/002792 | 1/2010 | |
| WO | WO2010/129654 | 11/2010 | |
| WO | WO2010/135734 | 11/2010 | |
| WO | WO2011031320 | 3/2011 | |
| WO | WO 2011/103026 | 8/2011 | |
| WO | WO 2012/068252 | 5/2012 | |

OTHER PUBLICATIONS

Wyman, et al., "Coordinated Development of Leading Biomass Pretreatment Technologies" Bioresource Technology 96 (2005) 1959-1966.

Bridgewater, A.V. "Principles and Practice of Biomass Fast Pyrolysis Process for Liquids" Journal of Analytical and Applied Pyrolysis, Jul. 1999 vol. 51, pp. 3-22, p. 15, para 4 to ph 16 para 2; p. 18, para 2.

Bridgewater, A.V. et al., "Fast Pyrolysis Processes for Biomass", Renewable and Sustainable Energy Reviews 4 (2000) 1-73.

CN201380008356.3—Chinese Office Action and Search Report—dated Apr. 18, 2016.

CN201380008356.3—Chinese Office Action and Search Report—dated Jun. 19, 2015.

EP13733852—Supplementary European Search Report—dated Jul. 17, 2015.

PCT/US2013/020354—WO2013103872—Written Opinion dated Apr. 26, 2013.

EP13733852—Supplementary European Search Report—dated Jul. 27, 2015.

CA2818304—Canadian Office Action—dated May 16, 2016.

EP2640505—European Search Report—dated Aug. 27, 2014.

International Search Report and Written Opinion issued in Connection with International Application No. PCT/US11/60997 dated Mar. 28, 2012.

* cited by examiner

TWO-STAGE PROCESS FOR CONVERSION OF SOLID BIOMASS MATERIAL

FIELD OF THE INVENTION

Embodiments of the invention relate generally to an improved process and apparatus for converting solid particulate biomass material to gaseous and liquid product. More particularly, embodiments of the invention relate to a two-stage process wherein the second stage operates at a higher temperature than the first stage.

INCORPORATION BY REFERENCE

The entirety of the following patents and patent applications are hereby expressly incorporated herein by reference: U.S. Provisional Application No. 61/583,681 and U.S. Provisional Application No. 61/475,129.

BACKGROUND OF THE INVENTION

Biomass, in particular biomass of plant origin, is recognized as an abundant potential source of fuels and specialty chemicals. Refined biomass feedstock, such as vegetable oils, starches, and sugars, can be converted to liquid fuels including biodiesel (e.g., methyl or ethyl esters of fatty acids) and ethanol. However, using refined biomass feedstock for fuels and specialty chemicals can divert food sources from animal and human consumption, raising financial and ethical issues.

Alternatively, inedible biomass can be used to produce liquid fuels and specialty chemicals. Examples of inedible biomass include agricultural waste (such as bagasse, straw, corn stover, corn husks, and the like) and specifically grown energy crops (like switch grass and saw grass). Other examples include trees, forestry waste, such as wood chips and saw dust from logging operations, or waste from paper and/or paper mills. In addition, aquacultural sources of biomass, such as algae, are also potential feedstocks for producing fuels and chemicals. Inedible biomass generally includes three main components: lignin, amorphous hemi-cellulose, and crystalline cellulose. Certain components (e.g., lignin) can reduce the chemical and physical accessibility of the biomass, which can reduce the susceptibility to chemical and/or enzymatic conversion.

Attempts to produce fuels and specialty chemicals from biomass can result in low value products (e.g. oxygen containing, etc. . . . ). Although such low value products can be upgraded into higher value products (e.g., conventional gasoline, jet fuel), upgrading can require specialized and/or costly conversion processes and/or refineries, which are distinct from and incompatible with conventional petroleum-based conversion processes and refineries. Thus, the wide-spread use and implementation of biomass to produce fuels and specialty chemicals faces many challenges because large-scale production facilities are not widely available and can be expensive to build. Furthermore, existing processes can require extreme conditions (e.g., high temperature and/or pressure, expensive process gasses such as hydrogen, which increases capital and operating costs), require expensive catalysts, suffer low conversion efficiency (e.g., incomplete conversion or inability to convert lingo-cellulosic and hemi-cellulosic material), and/or suffer poor product selectivity.

Therefore, a need remains for novel and improved processes for the conversion of solid biomass materials to produce fuels and specialty chemicals.

BRIEF SUMMARY OF THE INVENTION

Embodiments of the invention generally relate to processes and apparatuses for converting solid particulate biomass.

In accordance with an embodiment of the present invention, a two-stage reactor for the conversion of a solid particulate biomass material is provided including: (i) a first stage reactor in which at least part of the solid particulate biomass material is subjected to a pyrolysis reaction at a temperature T1, thereby forming primary reaction products; and (ii) a second stage reactor in which at least part of the primary reaction products are subjected to a catalytic conversion reaction at a temperature T2, which is higher than T1, thereby forming secondary reaction products, wherein the second stage reactor is in fluid communication with the first stage reactor.

In accordance with another embodiment of the present invention, a two-stage process for the conversion of solid particulate biomass material is provided including: (i) a first stage comprising the step of subjecting the solid particulate biomass material to a pyrolysis reaction in a first zone at a temperature T1 to produce primary reaction products; and (ii) a second stage comprising the step of subjecting at least part of the primary reaction products to a catalytic conversion reaction in a second zone at a temperature T2, which is higher than T1, and in the presence of a catalyst, to produce secondary reaction products, wherein the first and second zones are in fluid communication.

In accordance with another embodiment of the present invention, a process for converting solid particulate biomass material is provided including: (i) providing the solid particulate biomass material in a circulating fluidized reactor; (ii) pyrolyzing at least a portion of the solid particulate biomass material to form primary reaction products within a lower zone of the reactor at a temperature T1; and (iii) catalytically converting at least a portion of the primary reaction products into secondary reaction products in the presence of a catalyst within an upper zone of the reactor at a temperature T2, which is higher than T1.

BRIEF DESCRIPTION OF THE DRAWINGS

The features and advantages of embodiments of the invention will be illustrated with reference to the following drawings. The drawing of FIG. 1 is not to scale and certain features are shown exaggerated in scale or in schematic form in the interest of clarity and conciseness.

DETAILED DESCRIPTION OF THE INVENTION

Pyrolysis processes, in particular flash pyrolysis processes, are generally recognized as offering the most promising routes to the conversion of solid biomass materials to liquid products, generally referred to as bio-oil or bio-crude. In addition to liquid reaction products, these processes produce gaseous reaction products and solid reaction products. Gaseous reaction products comprise carbon dioxide, carbon monoxide, and relatively minor amounts of hydrogen, methane, and ethylene. The solid reaction products comprise coke and char.

In order to maximize the liquid yield, while minimizing the solid and non-condensable gaseous reaction products, the pyrolysis process should provide a relatively fast heating rate of the biomass feedstock. Lately, the focus has been on ablative reactors, cyclone reactors, and fluidized reactors to provide the fast heating rates. Fluidized reactors include both fluidized stationary bed reactors and transport reactors.

Transport reactors provide heat to the reactor feed by injecting hot particulate heat carrier material into the reaction zone. This technique provides rapid heating of the feedstock. The fluidization of the feedstock ensures an even heat distribution within the mixing zone of the reactor.

The biomass to be pyrolyzed is generally ground to a small particle size in order to optimize pyrolysis. The biomass may be ground in a grinder or a mill until the desired particle size is achieved. There is a particular need for apparatuses and processes for converting solid biomass into gaseous and liquid products that do not require extensive particle size reduction of the solid biomass material feed and do not require extensive upgrading of the reaction products.

Historically, entrained bed reactors or fluidized bed reactors have been used for the conversion of liquid products, using a conversion temperature exceeding the boiling point of the liquid feedstock. An example is the ubiquitous fluid catalytic cracking ("FCC") process, used in crude oil refineries for converting heavy crude oil fractions, such as vacuum gas oil (VGO) to lighter products, such as gasoline and diesel blending stocks. At the bottom of an FCC reactor, liquid feedstock is sprayed into a flow of a lift gas in which is entrained a hot, particulate catalyst. The heat carried by the particulate catalyst causes fast evaporation of the feedstock droplets. Due to this fast evaporation, the feedstock components become quickly and evenly heated. In addition, the feedstock vapors expand the volume of gases in the reactor, causing acceleration of both the catalyst particles and the feedstock components, ensuring vigorous mixing of the feedstock and the catalyst particles, and the virtual absence of back-mixing.

Entrained bed reactors operated with a solid particulate feedstock exhibit a mixing behavior that is distinctly different from liquid feedstock systems, such as the FCC reactor. Different from liquid feedstocks, solid biomass particles do not rapidly evaporate upon mixing with hot heat carrier particles. Instead, the solid particles become smaller in a process that can be described as reactive ablation. Initially, only the outer surface of the solid particle becomes hot enough for pyrolytic conversion of the solid biomass material to take place. The pyrolysis products evaporate from the outer shell of the solid particle, exposing an underlying layer of solid biomass material to the reactor temperature. Once hot enough for pyrolysis to take place, this outer layer also evaporates, etc. As a result, the biomass particle becomes gradually smaller as the pyrolysis reaction progresses. It will be appreciated, however, that this process is slow as compared to the evaporation of a VGO droplet in an FCC riser. The process is slowed down further by the virtually inevitable presence of moisture in the biomass feedstock, which needs to be evaporated before the temperature of the biomass material can be raised significantly above the boiling point of water.

Since the goal generally is to ensure complete conversion of the biomass material, the operator of the entrained bed reactor needs to select reactor conditions that provide a fast enough heat transfer to the solid biomass particles. This can be accomplished by selecting a high enough temperature of the particulate heat transfer material, and a high enough heat transfer medium/feedstock ratio. The focus to now has been primarily on a high temperature for the pyrolysis of the biomass, with lower temperatures used for further catalytic conversion of the primary reaction products from such pyrolysis.

Embodiments of the invention allow for the separation of the pyrolysis step and the catalytic conversion step for optimization of biomass conversion by utilizing a higher temperature in the catalytic conversion step as compared to the pyrolysis step. By separating the pyrolysis and the catalytic conversion processes, independent control of the reaction conditions of each process is possible, allowing the optimization of each process. For example, reaction conditions such as temperature of the reactor, catalyst to reaction product material mass ratio, residence time of the reaction products, and weight hourly space velocity (WHSV), as described below, can be independently controlled. Accordingly, each process is optimized resulting in an overall increase of the performance such as higher yield of bio-oil, lower oxygen content of bio-oil, lower yields of coke formation and overall higher quality of the final conversion product.

In some embodiments of the invention, a two-stage process is provided for the conversion of solid particulate biomass material, comprising (i) a first stage in which at least part of the solid particulate biomass material is subjected to thermal pyrolysis to produce primary reaction products; and (ii) a second stage in which at least part of the primary reaction products are catalytically converted to secondary reaction products at a higher temperature than the first stage.

In some embodiments, the two stage process comprises (i) pyrolyzing within a first stage zone of a reactor at least a portion of the solid particulate biomass under appropriate reaction conditions to produce one or more primary reaction products; and (ii) catalytically converting within a second stage zone of a reactor at least a portion of the primary reaction products using a catalyst under appropriate reaction conditions to produce one or more secondary reaction products. In preferred embodiments, the two stage process occurs in a single reactor. In a preferred embodiment, the reactor is a two-stage reactor.

Some embodiments of the invention relate to a two-stage reactor comprising a first stage reactor and a second stage reactor. The second stage reactor is positioned above the first stage reactor. The two-stage reactor can be a circulating fluidized reactor. In accordance with an embodiment of the invention, the first stage reactor and the second stage reactor can correspond to the lower and the upper zones or sections, respectively, of a single reactor. In accordance with other embodiments of the invention, the first and second stage reactors can be separate reactors. The first stage reactor and the second stage reactor can have different geometries. For example, the first stage reactor can have a frustrum geometry and the second stage reactor can be generally cylindrical. In some embodiments, and as discussed below, the first stage reactor and the second stage reactor can have different diameters. In the first stage reactor, at least part of the particulate solid biomass material is thermally pyrolyzed to form primary reaction products. The primary reaction products are conveyed from the first stage reactor to the second stage reactor. For this purpose, the second stage reactor is in fluid communication with the first stage reactor. In the second stage reactor at least part of the primary reaction products are catalytically converted to secondary reaction products.

The term "thermal pyrolysis" as used herein refers to a chemical conversion of a feedstock, such as a solid particulate biomass material, effected by heating the feedstock in an atmosphere that is substantially free of oxygen. The atmosphere may be an inert gas, such as nitrogen. Alternatively, the atmosphere can comprise a reducing gas, such as hydrogen, carbon monoxide, steam, or a combination thereof.

Thermal pyrolysis can be carried out in the substantial absence of a catalyst.

The process and the reactors can be used for converting any type of solid biomass material. Preferred are biomass materials comprising cellulose, in particular lignocellulose. Such materials are abundantly available, at low cost. Examples of cellulose-containing materials include algae, paper waste, and cotton linters. Examples of lignocellulosic materials include forestry waste, such as wood chips, saw dust, pulping waste, and tree branches; agricultural waste such as corn stover, wheat straw, bagasse, and energy crops such as eucalyptus, switch grass, and coppice.

Particulate solid biomass material is introduced into the first stage reactor. Any suitable means for conveying a solid particulate material may be used for this purpose. Examples include gravity feed from a hopper or other container, a screw conveyer, a positive displacement pump a pneumatic feeding system and the like. In a particularly preferred embodiment, the solid particulate biomass material is fluidized in a portion of the lift gas, and entrained into the first stage reactor by the lift gas.

In some embodiments, a heat exchanger is part of the feed system, so that the solid particulate biomass material can be heated or cooled prior to introduction into the first stage reactor.

In some embodiments, the first stage reactor can be operated as an ebullated bed. In preferred embodiments, the first stage reactor is operated as a circulating fluidized bed. The bed can be ebullated or fluidized by means of a lift gas. In some embodiments, a lift gas is injected into the first stage reactor. The lift gas can also be used for conveying primary reaction products from the first stage reactor to the second stage reactor.

The lift gas is preferably introduced into the first stage reactor at the bottom of the first stage reactor. It will be understood that a portion of the gas may be used to pre-fluidize the solid particulate biomass material, in which case this portion of the lift gas is introduced into the first stage reactor via the inlet for the particulate solid biomass material.

The lift gas preferably is essentially oxygen-free, so as to provide an oxygen-free atmosphere for the biomass conversion reaction. The lift gas may be an inert gas, for example nitrogen. Alternatively, the lift gas may comprise a reducing gas, such as hydrogen and/or carbon monoxide. The lift gas can comprise one or more hydrogen-donor compounds, such as steam, lower alkane (methane, ethane, and the like), or other hydrocarbons.

In another embodiment, the lift gas can comprise a hydrogen donor compound, for example components of tires, plastic waste, and the like.

In some embodiments, a second particulate material, other than the particulate solid biomass material is present in the first stage reactor. This material can be an inert particulate material, or a deactivated or regenerated particulate catalyst material, or a mixture of an inert particulate material, a deactivated particulate catalyst material, and/or a regenerated particulate catalyst material.

In one embodiment, the first stage reactor is operated such that the second particulate material remains in the first stage reactor. Specifically, the first stage reactor of this embodiment can be operated as an ebullated bed reactor. In this embodiment the second particulate material can be an inert material, such as sand.

In some embodiments, the first stage reactor is an entrained fluid bed reactor. In this embodiment, the second particulate material does not remain in the first stage reactor, but is conveyed, for example by the lift gas, to the second stage reactor. In some embodiments, a stream of the second particulate material is injected into the first stage reactor, to compensate for the material being conveyed to the second stage reactor.

In some embodiments, it is advantageous to use the second particulate material as a particulate solid heat carrier material. In one embodiment, the particulate solid heat carrier material is either a deactivated or regenerated particulate catalyst.

The particulate solid heat carrier material is preferably readily fluidizable. The material generally has a mean particle diameter in the range of from about 10 μm to 600 μm, preferably in the range of from about 50 μm to 200 μm. The particles preferably have a shape index in the range of 1 to 2. Most preferred are microspheres, having a shape index of about 1.

In some embodiments, the second stage reactor is an entrained fluid bed reactor. The second stage reactor can be provided with a system for injecting a particulate solid catalyst. Preferably, in the second stage reactor, at least part of the primary reaction products are contacted with a catalyst.

In some embodiments, independent control of the reaction conditions of the first stage reactor and of the second stage reactor, such as temperature and WHSV, is achieved by determining the first stage reactor and second stage reactor geometries. For example, the ability to control WHSV is important to the extent that too low a WHSV can result in a low conversion of feed to product and too high a WHSV can result in undesirable product reactions. In preferred embodiments, the internal diameter of the first stage reactor is $d_1$; the internal diameter of the second stage reactor is $d_2$; wherein $d_1 > d_2$.

The velocity of the lift gas in the first stage reactor is preferably sufficient to entrain the heat carrier particles. The velocity of the lift gas is relatively slow in the first stage reactor, and becomes accelerated upon entering the second stage reactor, as the second stage reactor can have a diameter which is smaller or significantly smaller than the diameter of the first stage reactor. The acceleration is inversely proportional to the square of the diameter ratio. Thus, if the diameter of the second stage reactor is one half of the diameter of the first stage reactor, the linear velocity of the lift gas in the second stage reactor is four times its linear velocity in the first stage reactor.

The mean particle diameter of the solid biomass material is preferably small enough for the biomass material to become ebullated or fluidized in the first stage reactor. The particle diameter does not need to be so small that the biomass material becomes entrained in the lift gas. In general, the biomass material particles remain in the first stage reactor until the reactive ablation process has reduced the particle size sufficiently for the particles to become entrained in the lift gas, however, in some embodiments biomass material passes from the first stage to the second stage wherein it is pyrolyzed.

In some embodiments, the processes and reactors of the invention avoid the need for milling or grinding the particles of biomass material to a very small size. Due to the low density of biomass material, particles up to about 20 mm in size can be fluidized in the first stage. Preferred are particles having a diameter in the range of from 2 mm to 15 mm, more preferably from 5 mm to 12 mm.

In some embodiments, the biomass particles may be so small as to become entrained by the lift gas in the first stage reactor. Thus, the reactor can be operated with biomass particles as small as 200 μm or less, which is an advantage when recycling biomass fines. Particularly desirable is a particulate biomass material feedstock having a mean particle diameter in the range of form 2 mm to 500 μm, more preferably from 1 mm to 700 μm.

In its steady state of operation, the first stage reactor can contain an entrained bed of heat transfer particles, and an ebullated bed of solid particulate biomass material. The latter bed is semi-stationary, as distinguished from stationary, in that it continuously loses ablated particles that become entrained, which are replenished with new feed particles of biomass material.

In accordance with other embodiments, a two-stage reactor/process can comprise, consist of, or consist essentially of: i) a first stage reactor, step or zone operated at a temperature T1 in which at least part of the solid particulate biomass material is subjected to a pyrolysis reaction, thereby forming primary reaction products; and ii) a second stage reactor, step or zone operated at a temperature T2, which is higher than T1, in which at least part of the primary reaction products are subjected to a catalytic conversion reaction, thereby forming secondary reaction products. The second stage reactor, step or zone is preferably in fluid communication with the first stage reactor, step or zone.

The temperature T1 is preferably in the range of from about 400° C. to about 550° C., more preferably from about 425° C. to about 525° C., and most preferably from 450° C. to 500° C. The temperature T2 is preferably in the range of from about 500° C. to about 650° C., more preferably from about 525° C. to about 625° C., and most preferably from 550° C. to 600° C.

The average residence time of the combination of the solid particulate biomass material and the primary reaction products in the first stage is preferably in the range of from about 3 seconds to about 120 seconds, more preferably in the range of from about 7 to about 60 seconds, and most preferably from 15 to 30 seconds.

The overall WHSV of the primary reaction products in the second stage is preferably in the range of from about 2.5 $hr^{-1}$ to about 80 $hr^{-1}$, more preferably in the range of from about 5 to about 40 $hr^{-1}$, and most preferably in the range of from 10 to 20 $hr^{-1}$.

In one embodiment, a part of the solid particulate biomass material, which has not been pyrolyzed in the first stage, can pass from the first stage to the second stage where it can then be subjected to a pyrolysis reaction in the second stage to form products which become a part of the primary reaction products.

The reactor/process can further comprise a separator for removing solid particles from the secondary reaction products, wherein the solid particles comprise deactivated catalyst particles. The reactor/process can further comprise a stripper for stripping volatile materials from the deactivated catalyst particles, thereby forming stripped catalyst particles. The reactor/process can further comprise a regenerator for regenerating at least part of the stripped catalyst particles, thereby forming regenerated catalyst particles. The regenerator can include the combustion of combustible components, such as coke on catalyst and char, resulting in an elevated temperature for the regenerated catalyst.

The reactor/process can further comprise a solids transfer system for recycling catalyst particles back to the first stage, or the second stage, or both the first and second stages. The solids transfer system for recycling can comprise a conduit(s) for injecting regenerated catalyst particles into the first and/or second stages. In one embodiment, the reactor/process can be two-stages and can further comprise a solids transfer system for recycling at least a portion of the regenerated catalyst particles back to the reactor/process. At least a portion of the regenerated catalyst particles can be recycled back to the second stage, and/or at least a portion of the regenerated catalyst particles can be recycled back to the first stage.

In some embodiments, the first reactor geometry can be determined using typical pyrolysis kinetics. See for example, C. Di Blasi et al (Ind. Eng. Chem. Res., Vol. 40 (2001) pg. 5547-5556) which is incorporated herein in its entirety.

At the temperature of the first stage, the solid particulate biomass material pyrolyzes to gaseous and vaporized primary reaction products. Unlike the solid particulate biomass material from which these reaction products emanate, the reaction products become immediately entrained.

The temperature in the first and second stages are primarily determined by the temperature of the catalyst/heat carrier being injected into such stages, and the (catalyst/heat carrier)/feed ratio. Alternatively, the temperature in either stage can be adjusted by external heating/cooling, or by injecting a gas or steam stream to provide heating or cooling.

In some embodiments, a stream of solid biomass particles, a stream of hot solid particulate heat carrier material and a flow of lift gas is injected into the first stage reactor to cause the solid particulate biomass material and the solid heat carrier material to become fluidized by the lift gas.

Due to the relatively long contact time of the solid biomass material in the first stage reactor, the process can handle biomass feedstock materials having high moisture content, for example up to 40 wt %. Materials having low moisture content can be handled as well, down to 1 wt % moisture or lower. In general materials having a moisture content in the range of from 5 wt % to 15 wt % provide ease of handling and are preferred for that reason.

In preferred embodiments, a catalyst is injected into the second stage reactor. This catalyst can comprise a solid acid, such as a zeolite. Examples of suitable zeolites include ZSM-5, zeolite-Y, and modified forms of ZSM-5 and zeolite-Y, dealuminated zeolites, ultrastable zeolites, mordenites, mesoporous materials, and combinations thereof. Additionally, the catalyst may comprise a super acid, for example sulfonated, phosphated, or fluorinated forms of zirconia, titania, alumina, silica-alumina, clays, and the like. In other embodiments, a super acid catalyst, such as sulfated zirconium super catalyst can be used.

The catalyst can comprise a solid base. Suitable examples include metal oxides, metal hydroxides, and metal carbonates, in particular the oxides, hydroxides and carbonates of alkali metals, alkaline earth metals, transition metals, and/or rare earth metals.

Particularly suitable solid bases are layered double hydroxides, mixed metal oxides, hydrotalcites, hydrotalcite-like materials, clays and combinations thereof. As used herein, the term "hydrotalcite-like materials" refers to materials having the structure of hydrotalcite, but wherein the divalent metal is not Mg and/or the trivalent metal is not Al.

The catalyst can comprise an alumina; preferred are aluminas having a relatively low specific surface area, such as alpha-alumina. Other examples include zirconia, titania, and clays, in particular calcined clays.

It has been found that catalysts for use in the process of the invention preferably have a low to moderate catalytic activity, as too high a catalytic activity easily leads to over-cracking of the pyrolysis products. Accordingly, preferred are catalysts comprising calcined materials, in particular materials that have been calcined at temperatures above 500° C., or even above 1000° C. or 1100° C.

Suitable examples of calcined materials include clay materials that have been calcined, preferably through the isotherm. Kaolin is an example of suitable clay. The clay material may comprise alkaline earth or transition metal or rare earth oxides, hydroxides, carbonates, hydroxy carbonates.

Catalyst materials having the desired moderate catalytic activity generally have a specific surface area, as measured by nitrogen adsorption using the Brunauer-Emmett-Teller ("BET") method in the range of from 1 to 400 m$^2$/g.

The catalysts, and methods of preparation thereof, described in Provisional US application designated as ID 243US-PRO (U.S. Provisional Application Ser. No. 61/475,129) has been incorporated by reference in its entirety into this application, for use as catalysts in the inventive process of this application.

Secondary reaction products, lift gas and solid heat carrier material are collected at the top of the second stage reactor. The solid material is separated from gases and vapors using any one of the known techniques in the art, or a combination of such techniques, such as one or more cyclones, optionally in combination with a hot gas filter. Vapors can be condensed in a condenser or a fractionator. Specifically, the process can comprise a further step of separating deactivated catalyst particles from the secondary reaction products.

In one embodiment, a liquid bio-oil can be condensed and separated from the secondary reaction products. The wt % yield of such liquid bio-oil produced in accordance with the invention is higher than the wt % yield of a bio-oil produced from such a reactor/process operated such that the temperature T2 is equal to or less than the temperature T1.

The solid material generally comprises deactivated catalyst particles, inorganic components from the biomass material, inorganic contaminants, and solid reaction products such as coke and char. Char particles can be readily separated, using well known oil refinery techniques.

In the regenerator, char and coke deposits are burned off in a stream of oxygen containing gas. In some embodiments, a heat exchanger is provided between the regenerator and the first and second stages, so that the regenerated catalyst particles can be cooled or heated prior to being injected into the stages to result in the targeted temperatures. The heat generated in the regenerator can be used to re-heat the heat carrier particles.

Figure 1:
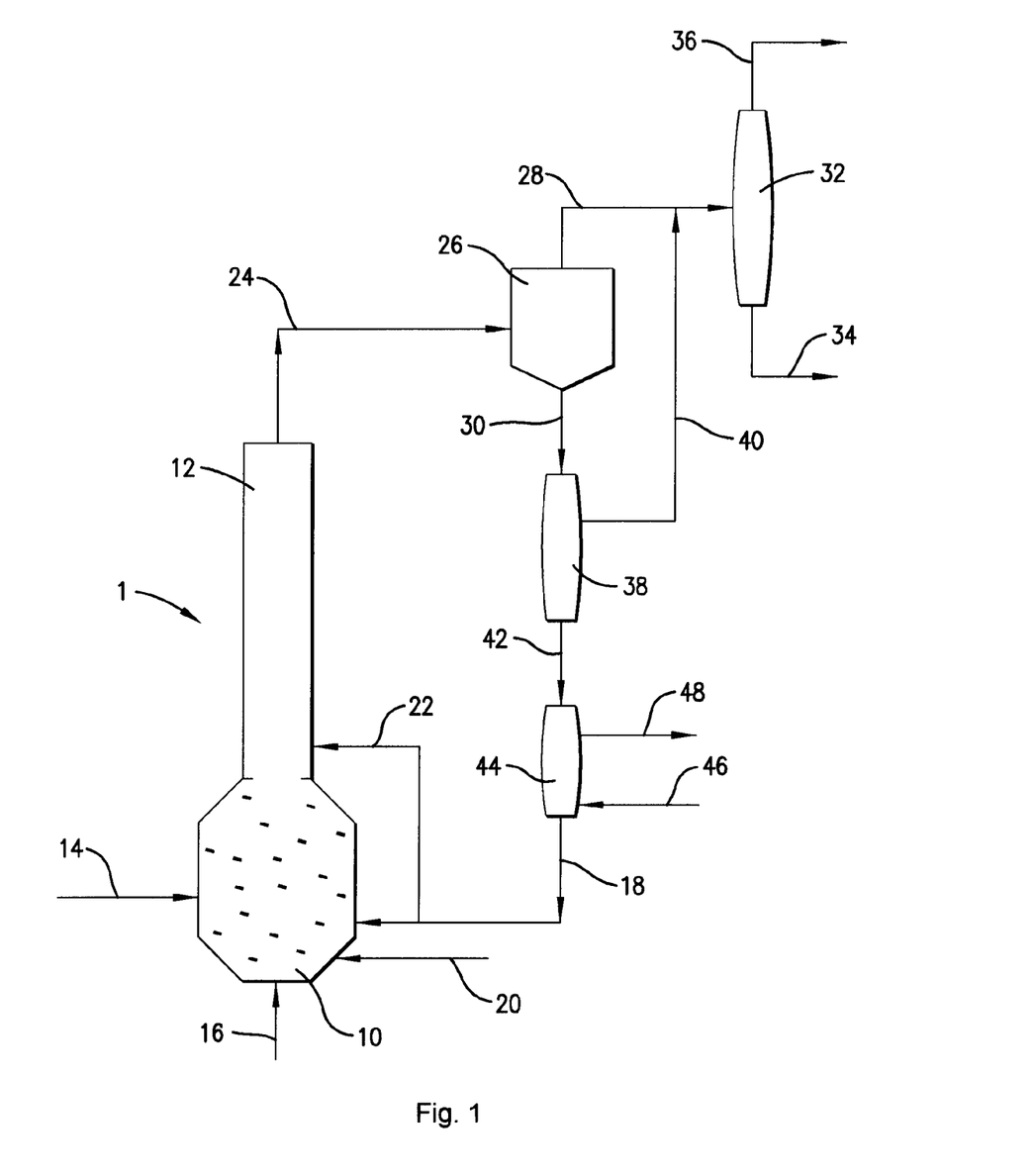
FIG. 1 is a schematic view of a two-stage reactor, for carrying out a specific embodiment of the process of the invention.

The following is a description of an embodiment of the invention, given by way of example only and with reference to the drawing. In the illustrated embodiment, the process is carried out in a two-stage reactor operated as an entrained fluid bed reactor.

Referring to FIG. 1, a two-stage reactor 1 is shown, comprising a first stage 10 and a second stage 12. Entering first stage 10 are biomass material 14, lift gas 16, and regenerated catalyst particles 18. Fresh catalyst/heat carrier material may be added to first stage 10 via line 20 to replenish catalyst/heat carrier material lost in the form of fines, etc.

In first stage 10, lift gas 16 forms an expanded bed of catalyst particles 18, well mixed with biomass material 14.

Regenerated catalyst particles 18 are also injected into the second stage 12 via lines 18 and 22.

Second stage 12 contains vaporized and gaseous primary reaction products of the biomass conversion, secondary reaction products, lift gas, entrained deactivated catalyst particles, injected regenerated catalyst particles and, in some cases, entrained biomass particles. The biomass particles preferably are reacted to full conversion in first stage 10, but can also be carried into second stage 12 for conversion (pyrolysis).

The gas/vapor/solids mixture 24 leaving overhead from second stage 12 is conveyed to cyclone 26, where it is split into a gas/vapor stream 28, and a solids stream 30. The vapor portion of gas/vapor stream 28 is condensed in fractionator 32, forming a liquid bio-oil and a gas stream comprising non-condensables. The liquid bio-oil is removed from fractionator 32 via line 34. The gas stream is removed via line 36, and can be recycled to first stage reactor 10 as at least a part of lift gas 16, optionally after removal of gaseous reaction products.

Solids stream 30 from cyclone 26 is sent to stripper 38, where reaction products are stripped off as stream 40, which can be combined with stream 28 as feed to fractionator 32.

Deactivated catalyst particles 42 from stripper 38 are sent to regenerator 44, where the deactivated catalyst particles are heated in a stream of an oxygen-containing gas 46, such as air. Coke and char are burned off the catalyst particles in regenerator 44. Flue gas 48, comprising CO and $CO_2$, can be combined with lift gas 16. Hot regenerated catalyst particles are removed from regenerator 44 via line 18, and can be recycled as described above.

EXAMPLES

In several runs, bio-oil was collected following the conversion of biomass (Southern Yellow Pine wood chips) in a two-zone system operated at the conditions described in the Table below, and in the presence of a phosphorous and zeolite containing catalyst, such as those described in ID243US-PRO, which has been incorporated by reference into this application. The bio-oil yields and quality are also presented below and in FIG. 2.

TABLE

| | 1. Base | 2. Base with Low Stripping Steam | 3. High 2$^{nd}$ Stage Temp & Low Stripping Steam | 4. Repeat of Run 3 | 5. Repeat of Run 3 with Steamed Catalyst |
|---|---|---|---|---|---|
| | | | Run Number | | |
| | | | 1$^{st}$ Stage | | |
| Cat/Feed ratio | 20.6 | 21.9 | 20.6 | 20.9 | 22.1 |
| Temp. (° F.) | 940 | 938 | 938 | 938 | 937 |

TABLE-continued

| | Run Number | | | | |
|---|---|---|---|---|---|
| | 1. Base | 2. Base with Low Stripping Steam | 3. High 2nd Stage Temp & Low Stripping Steam | 4. Repeat of Run 3 | 5. Repeat of Run 3 with Steamed Catalyst |
| 2nd Stage | | | | | |
| Stripping Steam, wt % of feed | 14.0 | 3.0 | 3.0 | 3.0 | 3.0 |
| Cat/Feed ratio | 20.6 | 21.9 | 20.6 | 20.9 | 22.1 |
| Temp. (° F.) | 949 | 961 | 1115 | 1113 | 1161 |
| Bio-Oil Product* | | | | | |
| Wt. % Oxygen | 10.8 | 13.5 | 8.9 | 8.8 | 9.8 |
| Yield (wt. %) (based on total weight of feed) | 19.2 | 19.9 | 20.2 | 19.8 | 19.6 |

*data points from each Run at Bio-Oil wt % Yields of around 20 wt %

Figure 2:
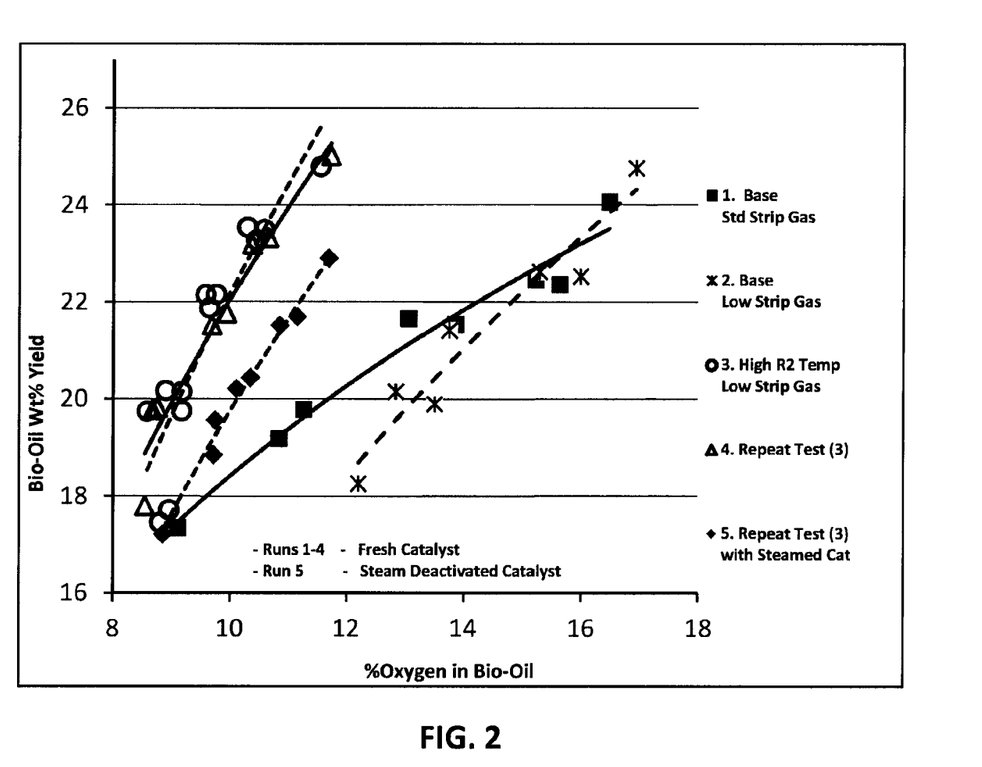
FIG. 2 is a graphical illustration of the wt % oxygen versus bio-oil wt % yield for several biomass conversion runs.

As shown in the Table above, and especially clear in FIG. 2, this invention clearly leads to a favorable combination of bio-oil yield and oxygen in bio-oil, in the deep deoxygenation region (i.e. <12% oxygen in bio-oil). The results can be taken as lower oxygen at constant oil yield; higher oil yield at constant oxygen; or any intermediate combination.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

Further, unless expressly stated otherwise, the term "about" as used herein is intended to include and take into account variations due to manufacturing tolerances and/or variabilities in process control.

Changes may be made in the construction and the operation of the various components, elements and assemblies described herein, and changes may be made in the steps or sequence of steps of the methods described herein without departing from the spirit and the scope of the invention as defined in the following claims.

What is claimed is:

1. A two-stage process for the conversion of solid particulate biomass material, the process comprising:
   (i) a first stage comprising the step of subjecting at least part of said solid particulate biomass material to a pyrolysis reaction in a first zone operated at a temperature T1 to produce primary reaction products, wherein T1 is in a range of from about 400° C. to about 550° C.; and
   (ii) a second stage comprising the step of subjecting at least part of said primary reaction products to a catalytic conversion reaction in a second zone operated at a temperature T2, which is higher than T1, and in the presence of a catalyst, to produce secondary reaction products, wherein T2 is in a range of from about 500° C. to about 650° C. and wherein said first and second zones are in fluid communication.

2. The two-stage process according to claim 1 wherein a part of said solid particulate biomass material passes from said first stage to said second stage and is subjected to a pyrolysis reaction in said second stage to form products which become a part of said primary reaction products.

3. The two-stage process according to claim 1 wherein said first and second zones each have an internal diameter and wherein said internal diameter of said second zone is less than said internal diameter of said first zone.

4. The two-stage process according to claim 1 further comprising removing solid particles from said secondary reaction products, wherein said solid particles comprise deactivated catalyst particles.

5. The two-stage process according to claim 4 further comprising stripping volatile materials from said deactivated catalyst particles, thereby forming stripped catalyst particles.

6. The two-stage process according to claim 5 further comprising regenerating at least part of said stripped catalyst particles, thereby forming regenerated catalyst particles.

7. The two-stage process according to claim 1 further comprising recycling catalyst particles back to said first zone, or said second zone, or both said first and second zones.

8. The two-stage process according to claim 6 further comprising recycling at least a portion of said regenerated catalyst particles back to said first zone, or said second zone, or both said first and second zones.

9. The two-stage process according to claim 8 wherein at least a portion of said regenerated catalyst particles are recycled back to said second zone.

10. The two-stage process according to claim 9 wherein at least a portion of said regenerated catalyst particles are recycled back to said first zone.

11. The two-stage process according to claim 1 wherein the average residence time of the combination of said solid particulate biomass material and said primary reaction products in said first zone is in the range of from about 3 to about 120 seconds.

12. The two-stage process according to claim 1 wherein the overall WHSV of said primary reaction products in said second zone is in the range of from about 2.5 $hr^{-1}$ to about 80 $hr^{-1}$.

13. The two-stage process according to claim 1 wherein a liquid bio-oil is condensed and separated from said secondary reaction products, and wherein the wt % yield of said liquid bio-oil is higher than the wt % yield of a bio-oil produced from said two-stage process wherein the temperature T2 is equal to or less than the temperature T1.

14. A process for converting solid particulate biomass material, the process comprising:
   (i) charging said solid particulate biomass material to a circulating fluidized reactor;

(ii) pyrolyzing at least a portion of said solid particulate biomass material to form primary reaction products within a lower zone of said circulating fluidized reactor operated at a temperature T1; and (iii) catalytically converting at least a portion of said primary reaction products into secondary reaction products in the presence of a catalyst within an upper zone of said circulating fluidized reactor operated at a temperature T2, which is higher than T1.

15. The process according to claim 14 wherein a part of said solid particulate biomass material passes from said lower zone to said upper zone and is subjected to a pyrolysis reaction in said upper zone to form products which become a part of said primary reaction products.

16. The process according to claim 14, wherein said lower and upper zones each have an internal diameter and wherein said internal diameter of said upper zone is less than said internal diameter of said lower zone.

17. The process according to claim 14 further comprising: removing solid particles from said secondary reaction products, wherein said solid particles comprise deactivated catalyst particles; stripping volatile materials from said deactivated catalyst particles, thereby forming stripped catalyst particles; and regenerating at least part of said stripped catalyst particles from said stripper, thereby forming regenerated catalyst particles.

18. The process according to claim 14 further comprising recycling catalyst particles back to said lower zone, or said upper zone, or both said lower and upper zones of said circulating fluidized reactor.

19. The process according to claim 17 further comprising recycling regenerated catalyst particles back to said circulating fluidized reactor.

20. The process according to claim 19 wherein at least a portion of said regenerated catalyst particles are recycled back to said upper zone of said circulating fluidized reactor.

21. The process according to claim 20 wherein at least a portion of said regenerated catalyst particles are recycled back to said lower zone of said circulating fluidized reactor.

22. The process according to claim 14 wherein T1 is in the range of from about 400° C. to about 550° C., and wherein T2 is in the range of from about 500° C. to about 650° C.

23. The process according to claim 14 wherein the average residence time of the combination of said solid particulate biomass material and said primary reaction products in said lower zone of said circulating fluidized reactor is in the range of from about 3 to about 120 seconds.

24. The process according to claim 14 wherein the overall WHSV of said primary reaction products in said upper zone of said circulating fluidized reactor is in the range of from about 2.5 to about 80 $hr^{-1}$.

25. The process according to claim 14 wherein a liquid bio-oil is condensed and separated from said secondary reaction products, and wherein the wt % yield of said liquid bio-oil is higher than the wt % yield of a bio-oil produced from said process wherein the temperature T2 is equal to or less than the temperature T1.

\* \* \* \* \*